United States Patent
Gomes Pereira et al.

(10) Patent No.: US 12,493,452 B2
(45) Date of Patent: Dec. 9, 2025

(54) CODE ADVISORY SYSTEM

(71) Applicant: Kyndryl, Inc., New York, NY (US)

(72) Inventors: Edson Gomes Pereira, Sao Paulo (BR); Adriano Augusto Rolfini, Sao Paulo (BR); Lucas Coelho de Almeida, Brasilia (BR); Maria Augusta Bastos Torres, Rio de Janeiro (BR)

(73) Assignee: Kyndryl, Inc., New York, NY (US)

( * ) Notice: Subject to any disclaimer, the term of this patent is extended or adjusted under 35 U.S.C. 154(b) by 394 days.

(21) Appl. No.: 18/085,525

(22) Filed: Dec. 20, 2022

(65) Prior Publication Data

US 2024/0201955 A1    Jun. 20, 2024

(51) Int. Cl.
*G06F 8/33* (2018.01)
*G06F 8/10* (2018.01)

(52) U.S. Cl.
CPC . *G06F 8/33* (2013.01); *G06F 8/10* (2013.01)

(58) Field of Classification Search
CPC ..................................... G06F 8/10; G06F 8/33
See application file for complete search history.

(56) References Cited

U.S. PATENT DOCUMENTS

| | | | |
|---|---|---|---|
| 7,231,343 B1 | 6/2007 | Treadgold et al. | |
| 8,356,278 B2 | 1/2013 | Drissi et al. | |
| 8,826,237 B2 * | 9/2014 | Balasubramanian | G06F 8/33 717/125 |
| 8,903,711 B2 * | 12/2014 | Lundberg | G06F 16/90332 704/8 |
| 9,235,494 B2 * | 1/2016 | Gautam | G06F 11/3616 |
| 10,268,753 B2 | 4/2019 | Bar-Or et al. | |
| 10,635,566 B1 * | 4/2020 | Talluri | G06F 11/3409 |
| 11,042,361 B1 * | 6/2021 | Espostio | G06F 30/15 |
| 11,579,868 B1 * | 2/2023 | Zhang | G06F 8/72 |
| 11,704,099 B1 * | 7/2023 | Morse | G06F 8/751 717/143 |
| 11,714,611 B2 * | 8/2023 | Makkar | G06F 8/33 717/101 |
| 11,763,078 B2 * | 9/2023 | Wilson-Thomas | G06F 40/274 715/816 |
| 11,914,993 B1 * | 2/2024 | Garg | G06F 8/77 |

(Continued)

FOREIGN PATENT DOCUMENTS

| | | | | |
|---|---|---|---|---|
| CN | 115390806 A | * | 11/2022 | ............. G06N 3/084 |
| CN | 115905501 A | * | 4/2023 | ......... G06F 18/2155 |
| WO | WO-2021231058 A1 | * | 11/2021 | ............. G06N 3/045 |

OTHER PUBLICATIONS

Gu, Hareesh, and Sanjay Kumar Dubey. "Academic coding guideline model-OCG." 2014 International Conference on Computing for Sustainable Global Development (INDIACom). IEEE, 2014.*

(Continued)

*Primary Examiner* — Francisco J Aponte
(74) *Attorney, Agent, or Firm* — CANTOR COLBURN LLP; Erik Swanson

(57) ABSTRACT

An example operation may include one or more of storing code that adheres to predefined coding standards of one or more programming languages within a data store, reading source code from a code file, comparing the source code to the code stored within the data store to determine one or more recommended code changes to the source code, and displaying the one or more recommended code changes via a user interface.

18 Claims, 15 Drawing Sheets

(56) References Cited

U.S. PATENT DOCUMENTS

| | | | | |
|---|---|---|---|---|
| 12,045,609 | B1* | 7/2024 | Sawant | G06F 40/20 |
| 12,190,081 | B1* | 1/2025 | Visser | G06F 8/33 |
| 2005/0223354 | A1* | 10/2005 | Drissi | G06F 8/36 |
| | | | | 717/114 |
| 2016/0034275 | A1* | 2/2016 | Abuelsaad | G06F 8/72 |
| | | | | 717/123 |
| 2016/0162527 | A1* | 6/2016 | Freed | G06F 8/34 |
| | | | | 707/797 |
| 2017/0315903 | A1* | 11/2017 | David | G06F 8/73 |
| 2017/0351511 | A1 | 12/2017 | Bar-Or et al. | |
| 2018/0196731 | A1 | 7/2018 | Moorthi et al. | |
| 2018/0253285 | A1* | 9/2018 | Howard | G06F 8/10 |
| 2019/0339947 | A1* | 11/2019 | Mccune | G06F 8/34 |
| 2020/0201627 | A1* | 6/2020 | Pham | G06F 16/9535 |
| 2021/0034335 | A1* | 2/2021 | Svyatkovskiy | G06N 3/088 |
| 2021/0042638 | A1* | 2/2021 | Novotny | G06N 20/00 |
| 2021/0081182 | A1 | 3/2021 | Seshadri et al. | |
| 2021/0318865 | A1* | 10/2021 | Farivar | G06F 8/41 |
| 2021/0349698 | A1* | 11/2021 | Wilson-Thomas | G06F 8/36 |
| 2022/0012018 | A1* | 1/2022 | Trim | G06N 20/00 |
| 2022/0012019 | A1* | 1/2022 | Wilson-Thomas | H04L 63/12 |
| 2022/0147345 | A1* | 5/2022 | Lake | G06F 8/71 |
| 2022/0179403 | A1* | 6/2022 | Miller | G05B 19/4185 |
| 2022/0334835 | A1* | 10/2022 | Gottschlich | G06N 3/045 |
| 2022/0358286 | A1* | 11/2022 | Wilson-Thomas | G06F 3/0482 |
| 2023/0081509 | A1* | 3/2023 | Banipal | G06N 5/04 |
| | | | | 706/12 |
| 2023/0281005 | A1* | 9/2023 | Groenewegen | G06F 8/71 |
| | | | | 717/120 |
| 2023/0315400 | A1* | 10/2023 | Tabachnyk | G06F 8/33 |
| | | | | 717/109 |
| 2023/0385037 | A1* | 11/2023 | Jayaraman | G06F 8/75 |
| 2023/0418565 | A1* | 12/2023 | Arumugam Selvaraj | G06F 16/3322 |
| 2024/0012909 | A1* | 1/2024 | Young | G06F 40/211 |
| 2024/0184570 | A1* | 6/2024 | Fu | G06N 3/0455 |

OTHER PUBLICATIONS

Fowkes, Jaroslav, et al. "Autofolding for source code summarization." IEEE Transactions on Software Engineering 43.12 (2017).*

Anonymous, Method and Process for Automatically Generating Development and Test Estimates From Early Text Descriptions of the Product, An IP.com Prior Art Database Technical Disclosure, Jun. 20, 2005.

Anonymous, Method to reduce the risk of regression associated to a set of changes in software code based on repository items suggestions, An IP.com Prior Art Database Technical Disclosure, Jul. 19, 2019.

Fu et al., Code Review and Cooperative Pair Programming Best Practice, Schlumberger Information Solutions AS, Stavanger, Norway, Jun. 7, 2017.

Allamanis et al., "Learning Natural Coding Conventions", arXiv:1402.4182v3 [cs.SE] Apr. 7, 2014, 13 pages.

Anonymous, "Codacy", URL: https://www.codacy.com, Retrieved: Jul. 9, 2024, 11 pages.

Anonymous, "Code Climate", URL: https://codeclimate.com, Retrieved: Jul. 9, 2024, 5 pages.

Anonymous, "SonarQube", URL: https://www.sonarqube.org, Retrieved: Jul. 9, 2024, 11 pages.

Scalabrino et al., "Improving Code Readability Models with Textual Features", 2016 IEEE 24th International Conference on Program Comprehension (ICPC), 2016, pp. 1-10.

* cited by examiner

210

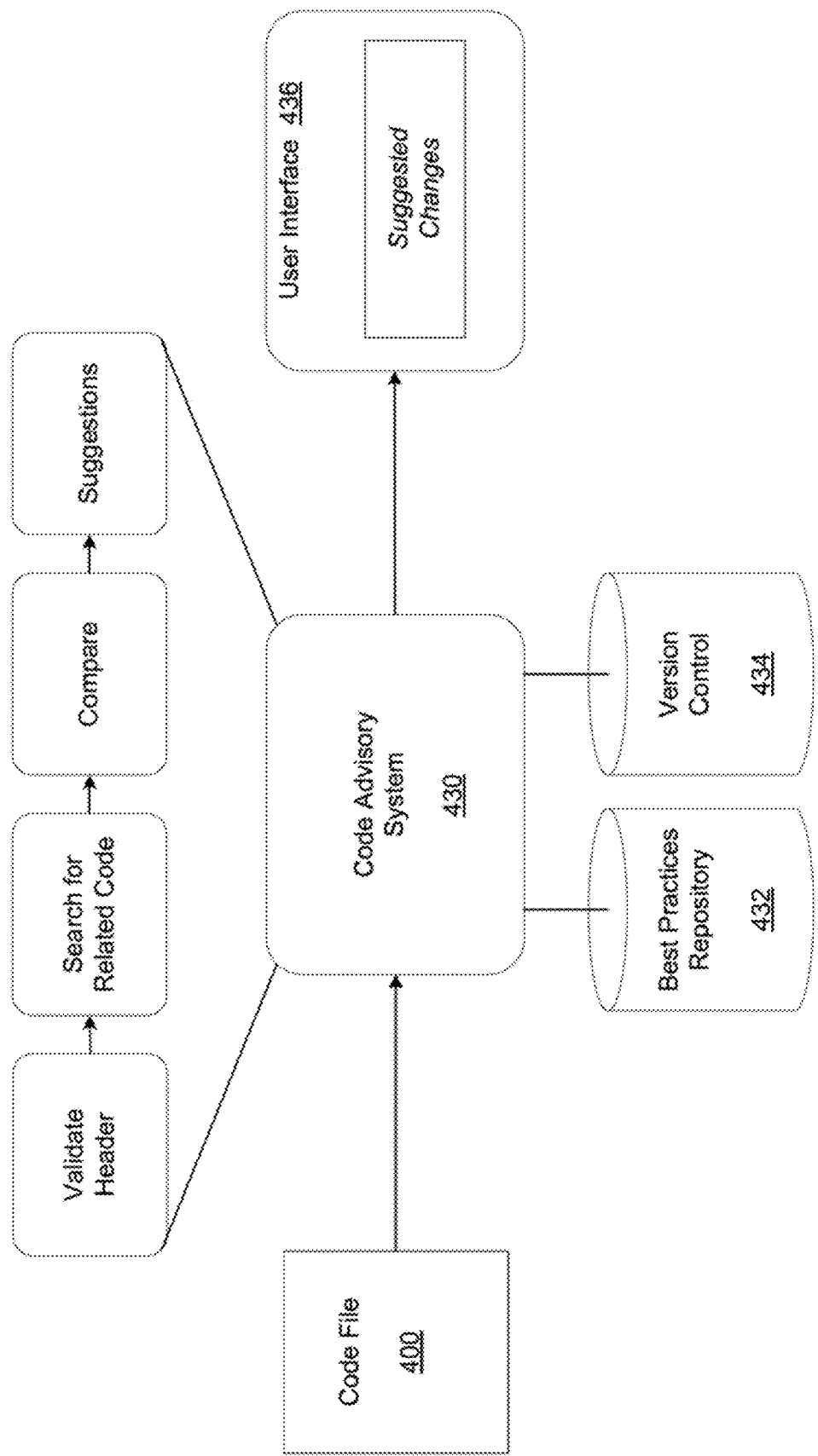

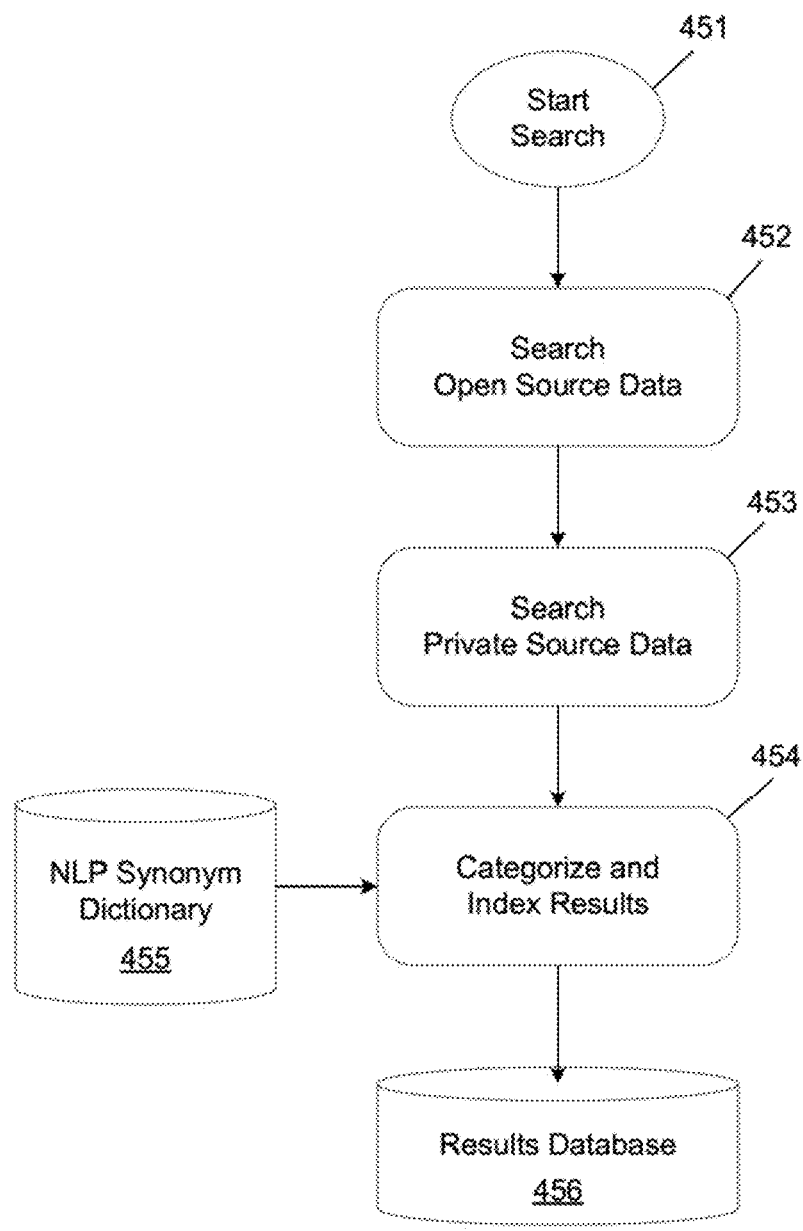

FIG. 4D

User Interface 460

Recommended Source Code 462

```
def updated_doctor_experience(doctor_id):
    # Get joining date
    con = get_connection()
    cursor = connection.cursor()
    select_query = """select joining date from Doctor_ID = ?
    cursor.execute(select_query, (doctor_id,))
    joining_date = cursor.fetchone()

# calculate experience in years
    joining_date1 = datetime.datetime.strpmtime ('-'.join(map(str,data)),
    today_date = datetime.datetime.now()
    experience = relativedelta(today_date, joining_date1).years
    con.commit()
    close_connection(con)
```

[ACCEPT] [CANCEL]

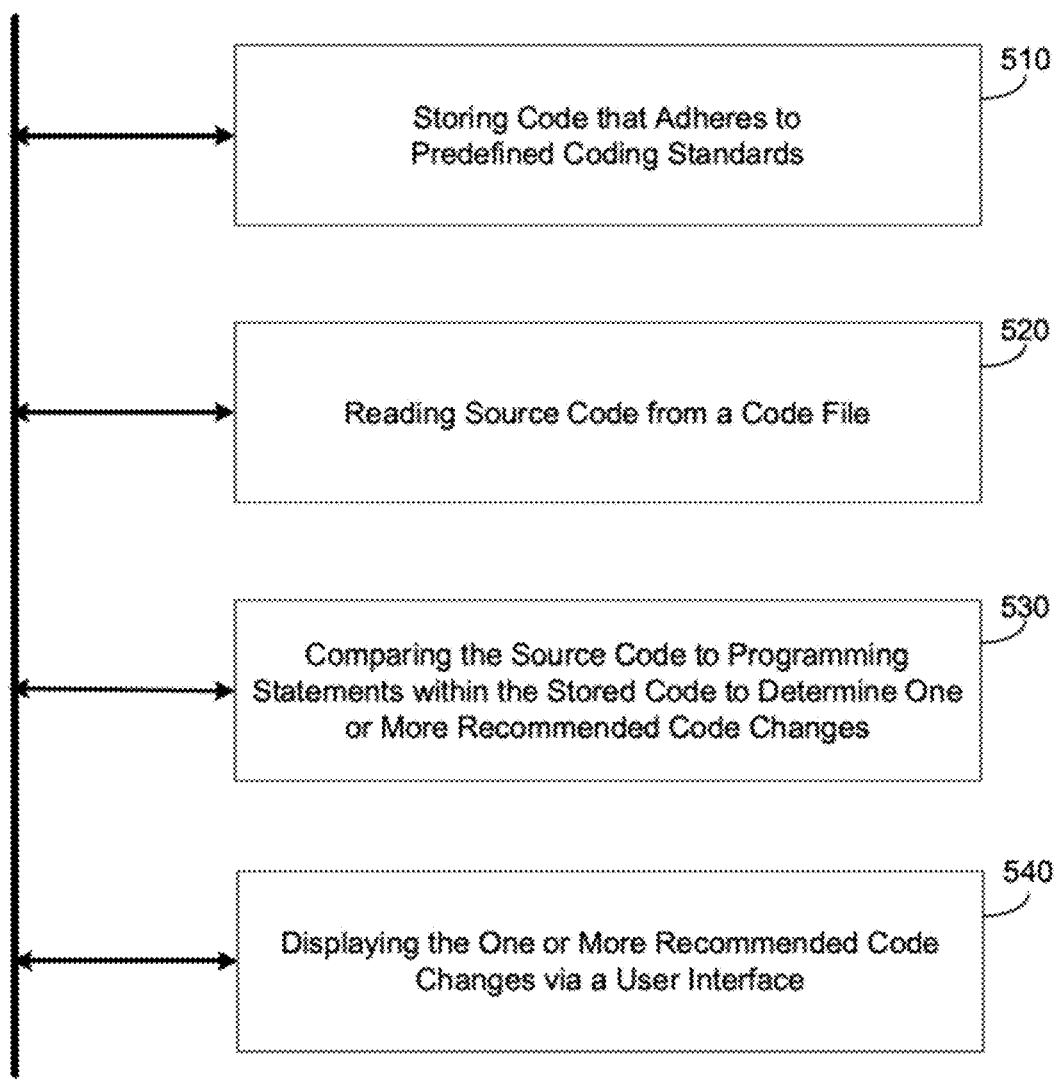

CODE ADVISORY SYSTEM

BACKGROUND

In a collaborative development community, it is common for hundreds or even thousands of developers to share/publish code together. However, it can be difficult to maintain coherence among all of the developers within the community especially when developers have unique coding styles. As a result, code within the community may vary widely in style and format. Furthermore, different programming languages are often capable of being used to develop code for accomplishing the same task. In other words, developers often have a choice or preference of which programming language to use. Each programming language may have different styles and nuances associated therewith that are considered industry "best practices". Conforming to these "best practices" all the time can be difficult for a developer.

SUMMARY

One example embodiment provides an apparatus that may include a data store configured to store code that adheres to predefined coding standards of one or more programming languages, and a processor that may be configured to read source code from a code file, compare the source code to programming statements stored in the data store which adhere to the predefined coding standards to determine one or more recommended code changes to the source code, and display the one or more recommended code changes with the source code via a user interface.

Another example embodiment provides a method that may include storing code that adheres to predefined coding standards of one or more programming languages within a data store, reading source code from a code file, comparing the source code to programming statements stored in the data store which adhere to the predefined coding standards to determine one or more recommended code changes to the source code, and displaying the one or more recommended code changes with the source code via a user interface.

A further example embodiment provides a computer-readable medium comprising instructions, that when read by a processor, cause the processor to perform one or more of storing code that adheres to predefined coding standards of one or more programming languages within a data store, reading source code from a code file, comparing the source code to programming statements stored in the data store which adhere to the predefined coding standards to determine one or more recommended code changes to the source code, and displaying the one or more recommended code changes with the source code via a user interface.

BRIEF DESCRIPTION OF THE DRAWINGS

FIG. 4B is a diagram illustrating an example of a process of generating recommended code changes based on the submitted code file and best practices according to an example embodiment.

FIG. 4C is a diagram illustrating a process of comparing the submitted code to predefined coding standards according to an example embodiment.

FIG. 4D is a diagram illustrating an example of a user interface displaying the recommended code changes according to an example embodiment.

FIG. 5 is a diagram illustrating a method of generating recommended code changes according to an example embodiment.

DETAILED DESCRIPTION

Figure 1A:
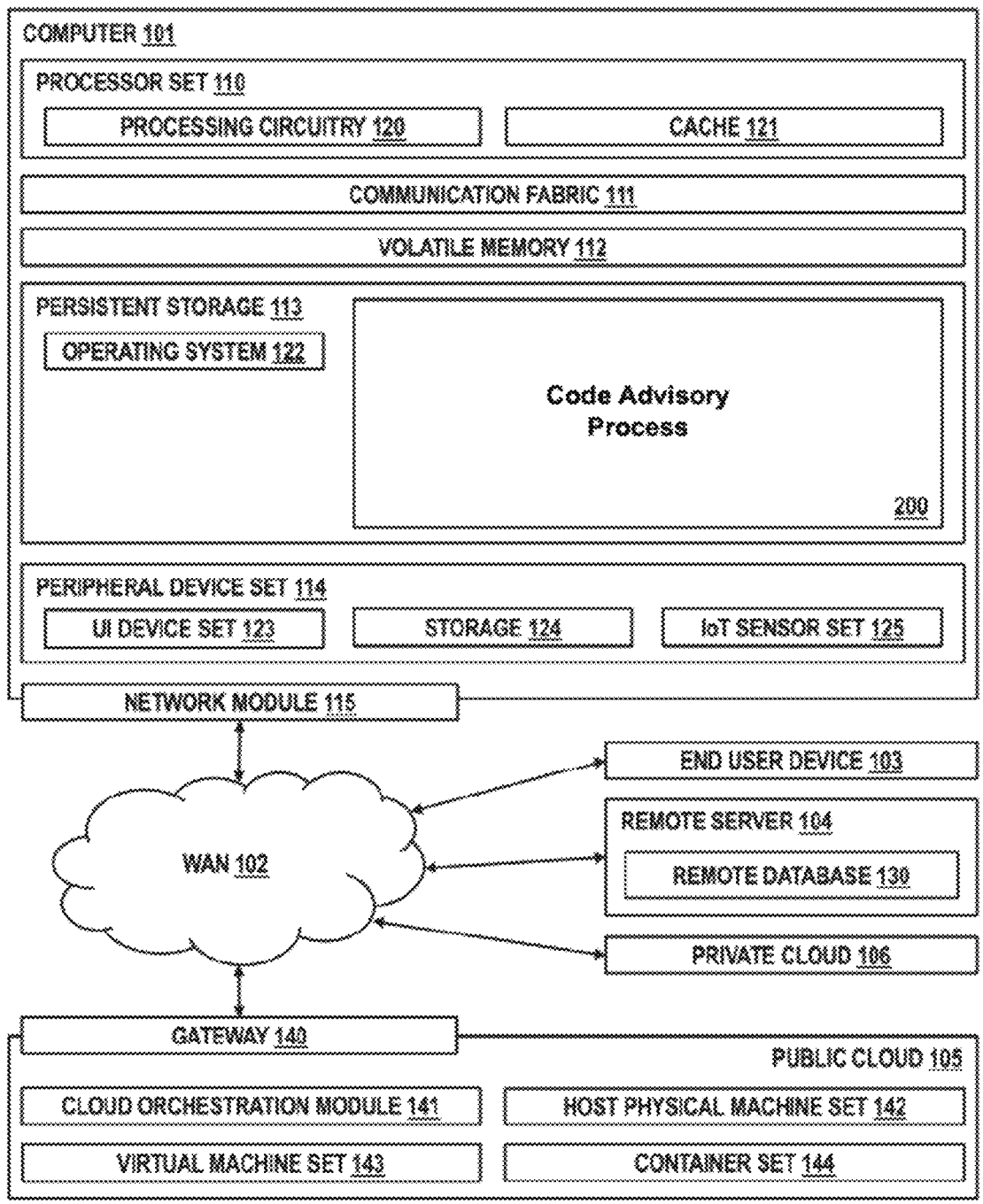
FIG. 1A is a diagram illustrating a computing environment according to an embodiment of the present invention.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

In the example embodiments, a software development process may be improved by enforcing code standards and patterns to describe the purpose of the code and provide better understanding and readability. In particular, a code advisory system may be hosted within a development environment and may suggest edits to programming code to adhere the programming code to predefined coding standards. As a result, the software maintenance and troubleshooting processes can be improved because the advisory code system can facilitate comprehension of the predefined coding standards include best practices while maintaining consistency among all developers in a group.

As an example, the code advisory system may be hosted by a cloud platform, although embodiments are not limited thereto. The predefined coding standards may be pulled/identified from best practices guidelines that are available on the web (e.g., open source guidelines, third-party guidelines, programming language standards, etc.) or developed internally by an organization. The predefined coding standards may provide predefined terms/names for class names, variables, programming statements, methods, code objects, and the like.

The code advisory system may identify programming statements within the submitted code which do not adhere to the predefined coding standards adopted by the organization by comparing the code to previously-stored code that does adhere to the predefined coding standards. Here, the code advisory system may suggest changes to the programming statements within the submitted code which do adhere to the predefined standards of the organization. Furthermore, the suggestions can be visualized within a user interface or other dashboard of an integrated development environment thereby enabling the developer to use the suggestions during the development process of the program.

Accordingly, the code advisory system described herein can alleviate the lack of coherence among a group of programmers within a shared programming community such as a large corporate organization or other shared development community. For example, the code advisory system can ensure that the submitted code has good readability according to the best practices of the industry and standardize the classes, variables, methods, statements, and the like, within the code of all developers coupled to the code advisory system. The code advisory system can also improve productivity among teams by keeping different sections of the code similar in style and format. Furthermore, for developers, the automated suggestions are in real-time and while the developer is developing the software thus incorporating the suggestions into the process at a time where they can be used in the most efficient manner.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure, including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community with shared concerns (e.g., mission, security requirements, policy, and compliance considerations). It may be managed by organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1A, a computing environment 100 is depicted. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again, depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for executing at least some of the computer code involved in performing the inventive methods, such as code advisory process 200. In addition to block 200, computing environment 100 includes, for example, computer 101, wide area network (WAN) 102, end-user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smartphone, smartwatch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is a memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off-chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric comprises switches and electrically conductive paths, such as the switches and electrically conductive paths that make up busses, bridges, physical input/output ports, and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read-only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smartwatches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, this data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanations of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as communicating with WAN 102, in other embodiments, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 1B:
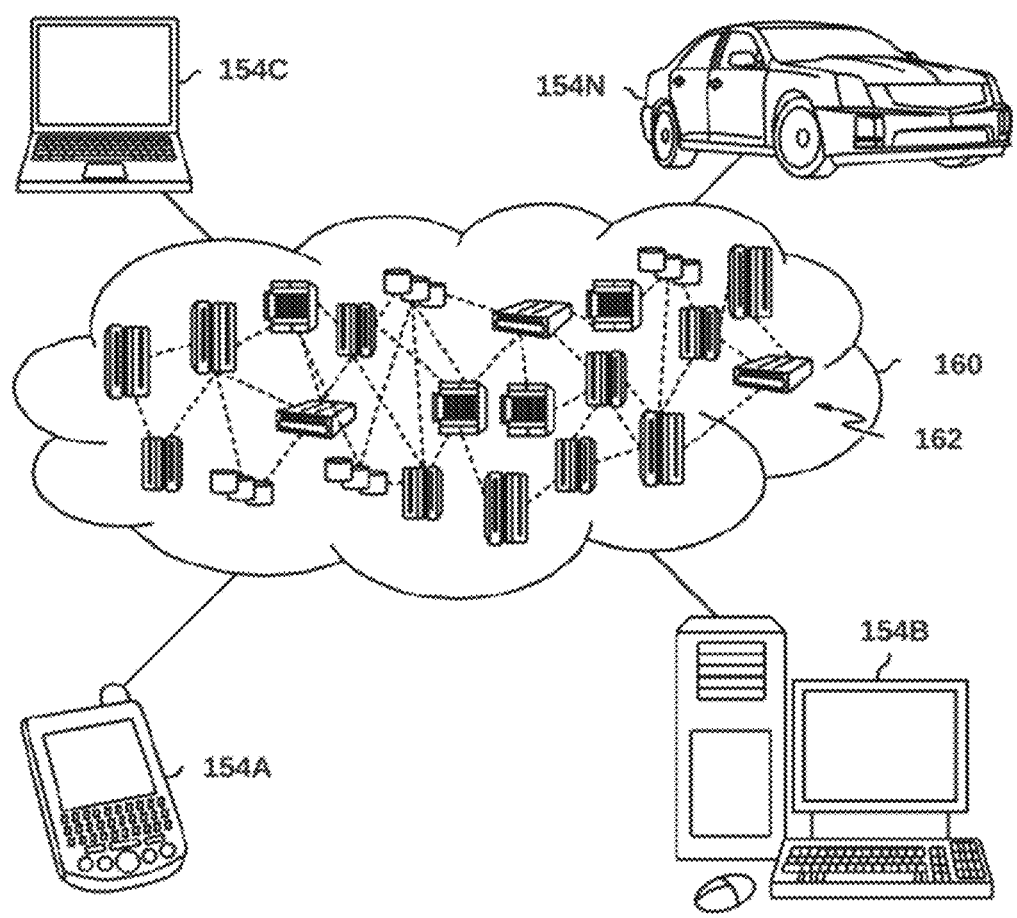
FIG. 1B is a diagram illustrating a cloud computing environment according to an example embodiment.

Referring now to FIG. 1B, an illustrative cloud environment 150 is depicted. As shown, cloud computing environment 160 includes one or more cloud computing nodes 162 with which local computing devices used by cloud consumers, such as, for example, personal digital assistant (PDA) or cellular telephone 154A, desktop computer 154B, laptop computer 154C, and/or automobile computer system 154N may communicate. Nodes 162 may communicate with one another. They may be grouped (not shown) physically or virtually in one or more networks, such as Private, Community, Public, or Hybrid clouds as described hereinabove, or a combination thereof. This allows cloud computing environment 160 to offer infrastructure, platforms and/or software as services for which a cloud consumer does not need to maintain resources on a local computing device. It is understood that the types of computing devices 154A-N shown in FIG. 1B are intended to be illustrative only and that computing nodes 162 and cloud computing environment 160 can communicate with any type of computerized device over any type of network and/or network addressable connection (e.g., using a web browser).

Figure 2A:
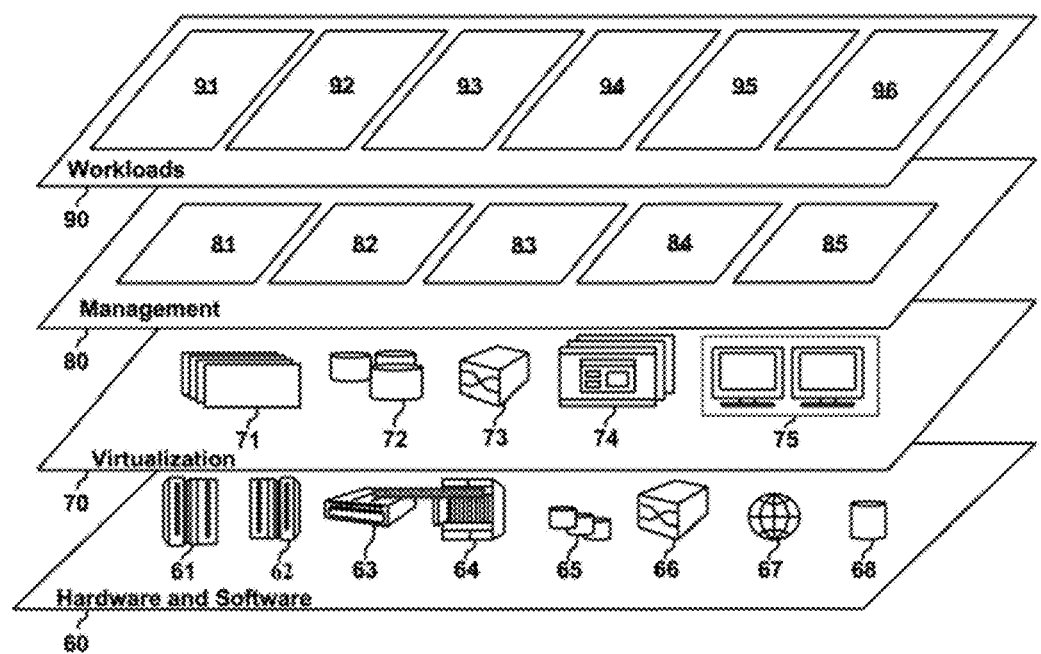
FIG. 2A is a diagram illustrating an example of abstraction model layers of a cloud platform according to an example embodiment.

Referring now to FIG. 2A, a set of functional abstraction layers 210 provided by cloud computing environment 160 (FIG. 1B) is shown. It should be understood in advance that the components, layers, and functions shown in FIG. 2A are intended to be illustrative only, and embodiments of the invention are not limited thereto. As depicted, the following layers and corresponding functions are provided: Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing to consume these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code advisory processing 96.

Figure 2B:
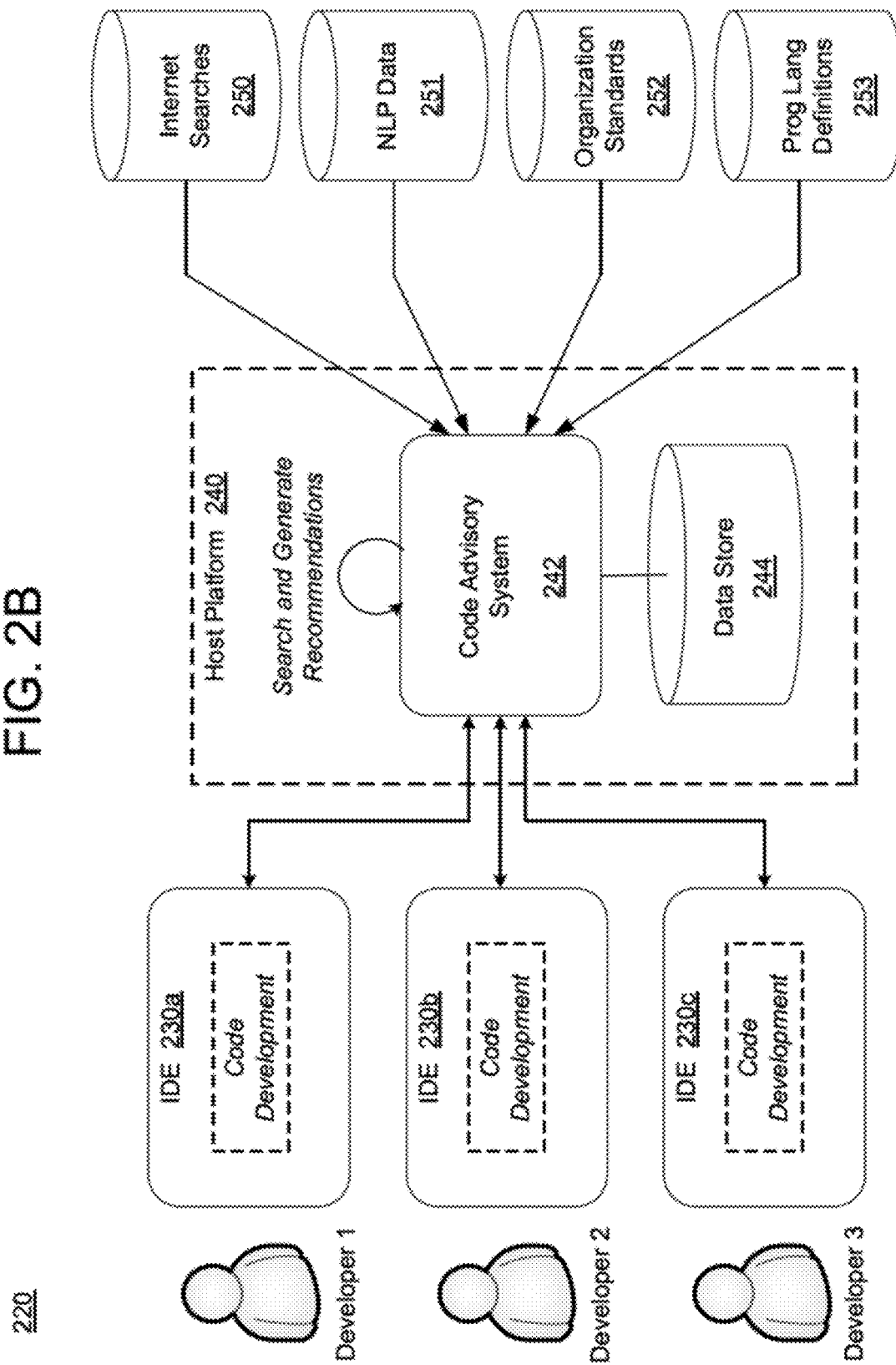
FIG. 2B is a diagram illustrating an example of an code advisory system for ensuring adherence to best practices according to example embodiments.

FIG. 2B illustrates an example of an code advisory system 242 for performing the code advisory processing 96 according to example embodiments. Referring to FIG. 2B, the code advisory system 242 is hosted by a host platform 240 such as a cloud platform, web server, database, distributed system, or the like. The code advisory system 242 may include a software application or service that is configured to generate recommended code changes to adhere to best practices or otherwise recommended practices that are previously stored in advance. The code advisory system 242 also includes a connected data store 244 with predefined coding standards stored therein. The coding standards may be queried from external data sources and analyzed for best practices of various programming languages. For example, different coding standards may be considered "best practice" for different programming languages such as different best practices for programming languages JAVA, PYTHON, C, C++, and the like, respectively.

According to various embodiments, the code advisory system 242 may ingest code samples, code standards, code templates, and the like, from various sources including, but not limited to, internet searching data 250 detected from internet searches of available content on the internet, natural language processing (NLP) data 251 obtained from analyzing data, organizational standards 252 exposed from an API or other mechanism, programming language definitions 253 that are available from open source and other locations, and the like. The best practices data may include samples of code (e.g., source code) such as objects, methods, programming statements, and the like. The code that adheres to predefined coding standards may be stored in one or more data stores such as the connected data store 244.

In operation, a number of developers may access an integrated development environment (IDE) 230 that is coupled to the code advisory system 242. Here, the IDE and the code advisory system 242 may be hosted by the host platform 240 at a publicly available URL where the developers can each access their own instance of the IDE. For example, a first developer may access a first instance 230a of the IDE, a second developer may access a second instance 230a of the IDE, and a third developer may access a third instance 230c of the IDE. Here, the developers may simultaneously access the code advisory system 242 which is integrated into or otherwise in communication with the IDE.

In the example embodiments, the developers shown in FIG. 2B may submit code to the code advisory system 242 via the respective IDEs and receive "feedback" on their submitted code which is based on best practices. That is, developers can be provided with feedback of their proposed source code that is based on industry best practices and in an automated manner in real-time. Furthermore, the code advisory system 242 can simultaneously interact with multiple developers thereby ensuring developer efficiency while maintaining versioning control.

The code advisory system may capture code from a code file that is submitted by a developer to a software repository (e.g., in response to a SAVE operation, etc.) and compare the code to predefined code samples which adhere to predefined coding standards (e.g., industry best practices) to validate the code against market best practice and corporate guidelines. It works as a partner to the code developer of any programming language. In some embodiments, the code file may include a header which the developer may use to pass information to the code advisory system 242. For example, the header may store values that identify the programming language of the code and a description of the code from the inventor such as keywords, methods, class names, and the like. This information can be read from the header by the code advisory system 242 and used to expedite the search process for similar code samples.

In some embodiments, the description read from the header may be compared by the code advisory system 242 to code that is obtained from open and private sources which suggest class names, variables, best practices, code repositories according to best practices and any other predefined coding standards. The code used for comparison can ensure that cohesion and adherence of variables and entities considered best practice are implemented community-wide in an automated manner. In some cases, the code advisory system 242 may offer "hot" content to the developer based on the description in the header such as suggested names of variables, classes and methods that keep the code in line with best practices (including the language of the description—eg: Portuguese, English, Spanish, German).

In some embodiments, the code advisory system 242 may suggest syntax improvements that make the code more readable for humans such as skipping lines, spacing components, exempting, etc. The sources of data for the search can include open-source repositories, question forums, technical forums, online search tools, private search tools (on site, intranet), internal files and documents, etc., that can contain technical knowledge about programming. The sources of data on the suggested names can include dictionaries of different programming languages and a pre-set set of good nomenclature practices.

The code advisory system 242 provides an improved way to analyze source code and recommend changes to its development to thereby bring more "human readability" in an agnostic coding language way. Also, the code advisory system 242 can help to normalize data in various software projects so that search engines can perform better indexing software project data and promoting more reusable code. Some of the benefits of the code advisory system 242 include improving the cohesiveness and readability of code throughout the community, maintain readability of a code repository, apply private and public knowledge of best practices to a code and verify it programmatically, categorize and index results of search and also find synonyms to suggest better names for variables, classes, objects, among others, generate a score of cohesion for texts (which is applied to the header of a code), calculate a score for readability and cohesion, and the like.

Figure 3A:
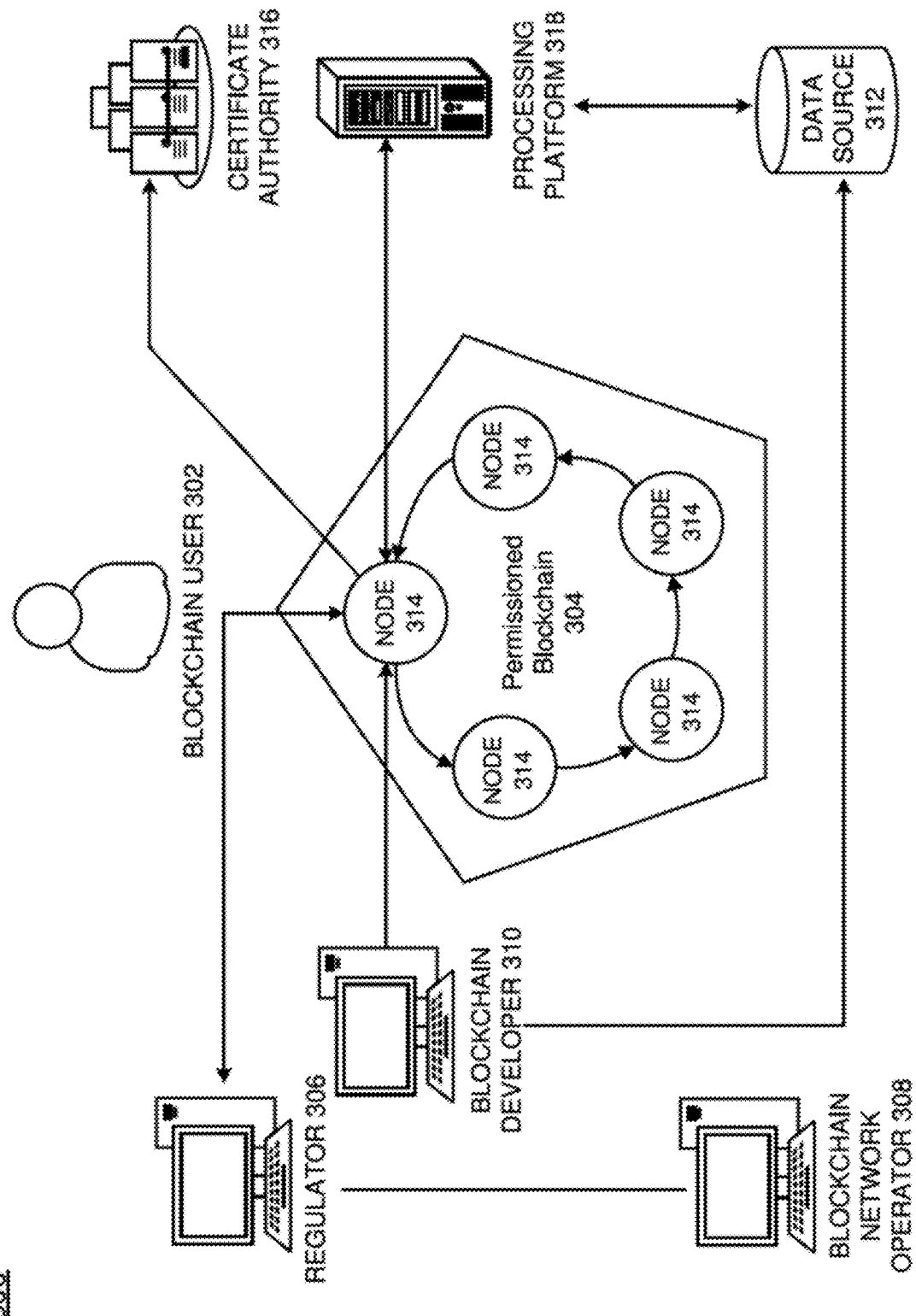
FIG. 3A is a diagram illustrating a permissioned network, according to example embodiments.

FIG. 3A illustrates an example of a permissioned blockchain network 300, which features a distributed, decentralized peer-to-peer architecture. The blockchain network may interact with the cloud computing environment 160, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger, whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
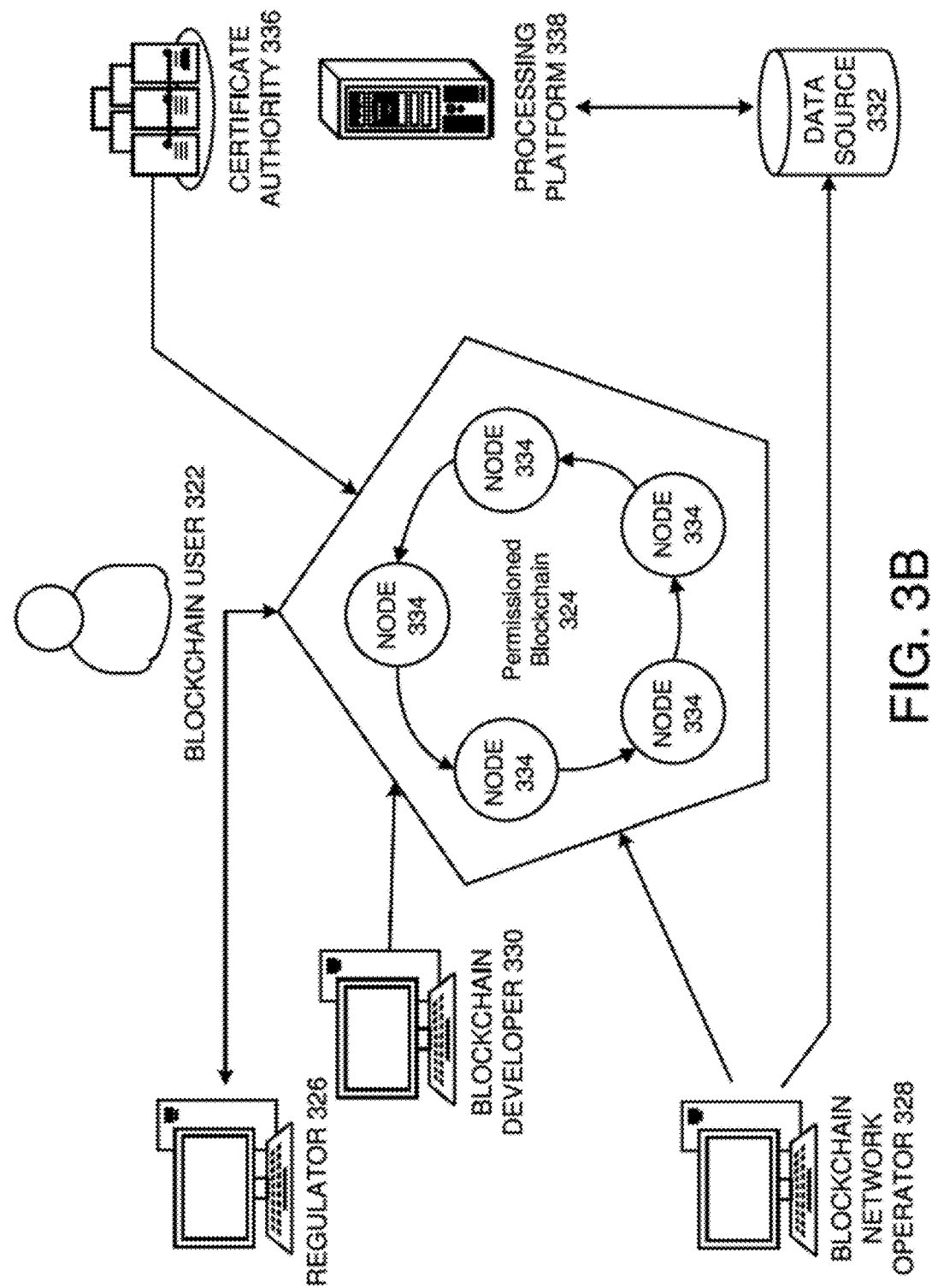
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger, whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains, which require permission to join, anyone can join a permissionless blockchain. For example, to join a permissionless blockchain a user may create a personal address and begin interacting with the network by submitting transactions and hence adding entries to the ledger.

Additionally, all parties have the choice of running a node on the system and employing the mining protocols to help verify transactions.

Figure 3C:
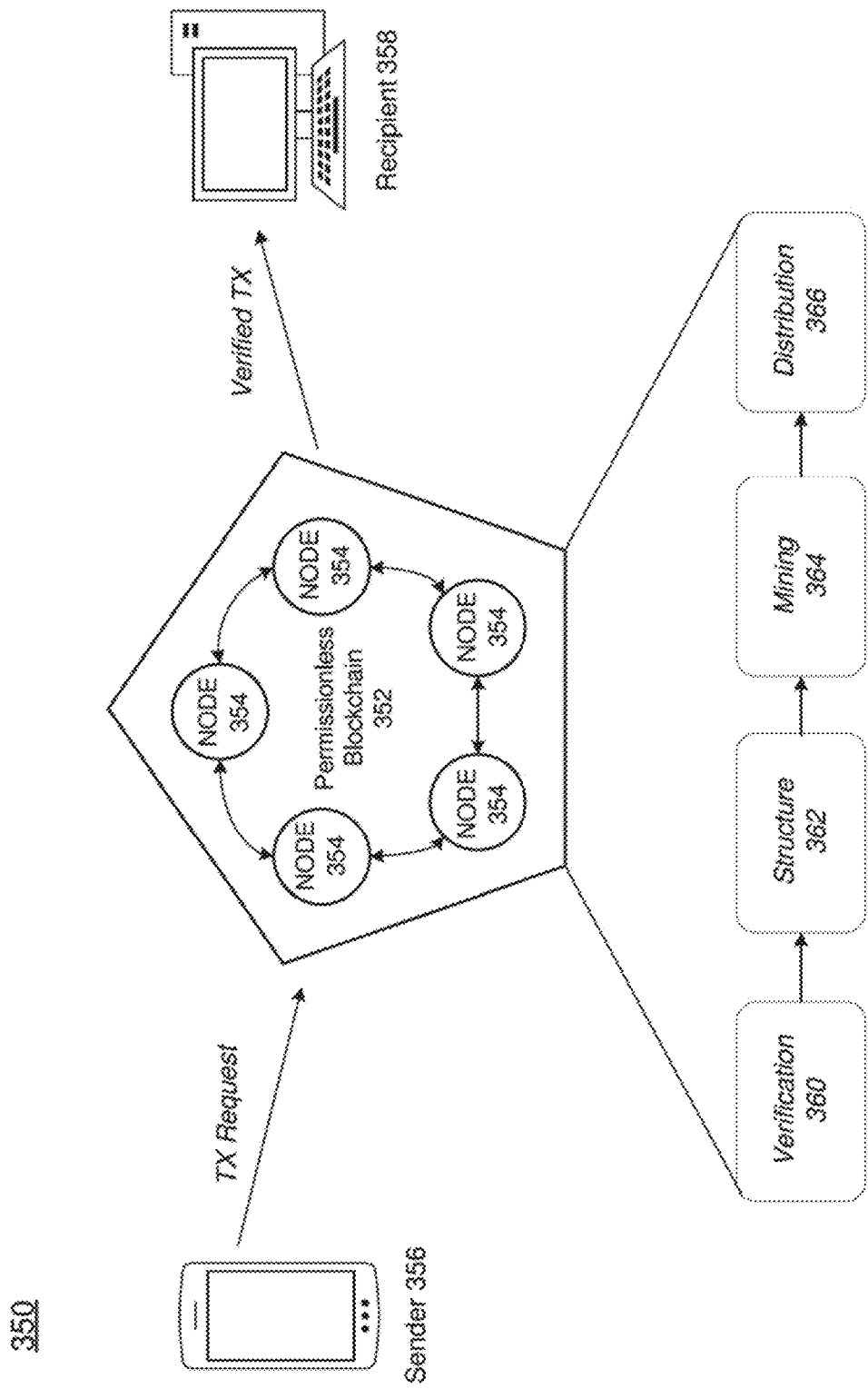
FIG. 3C is a diagram illustrating a further permissionless network, according to example embodiments.

FIG. 3C illustrates a process 350 of a transaction being processed by a permissionless blockchain 352, including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters, the nodes verify 360 the transaction based on rules (which may be pre-defined or dynamically allocated) established by the permissionless blockchain 352 creators. For example, this may include verifying the identities of the parties involved, etc. The transaction may be verified immediately or it may be placed in a queue with other transactions, and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256-bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW, thereby ensuring correct answers. In other words, a potential solution must prove that computing resources were drained in solving the problem. In some types of permissionless blockchains, miners may be rewarded with value (e.g., coins, etc.) for correctly mining a block.

Here, the POW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352, and all nodes 354 add the block to a majority chain which is the permissionless blockchain's 352 auditable ledger. Furthermore, the value in the transaction submitted by the sender 356 is deposited or otherwise transferred to the digital wallet of—the recipient device 358.

Figure 3D:
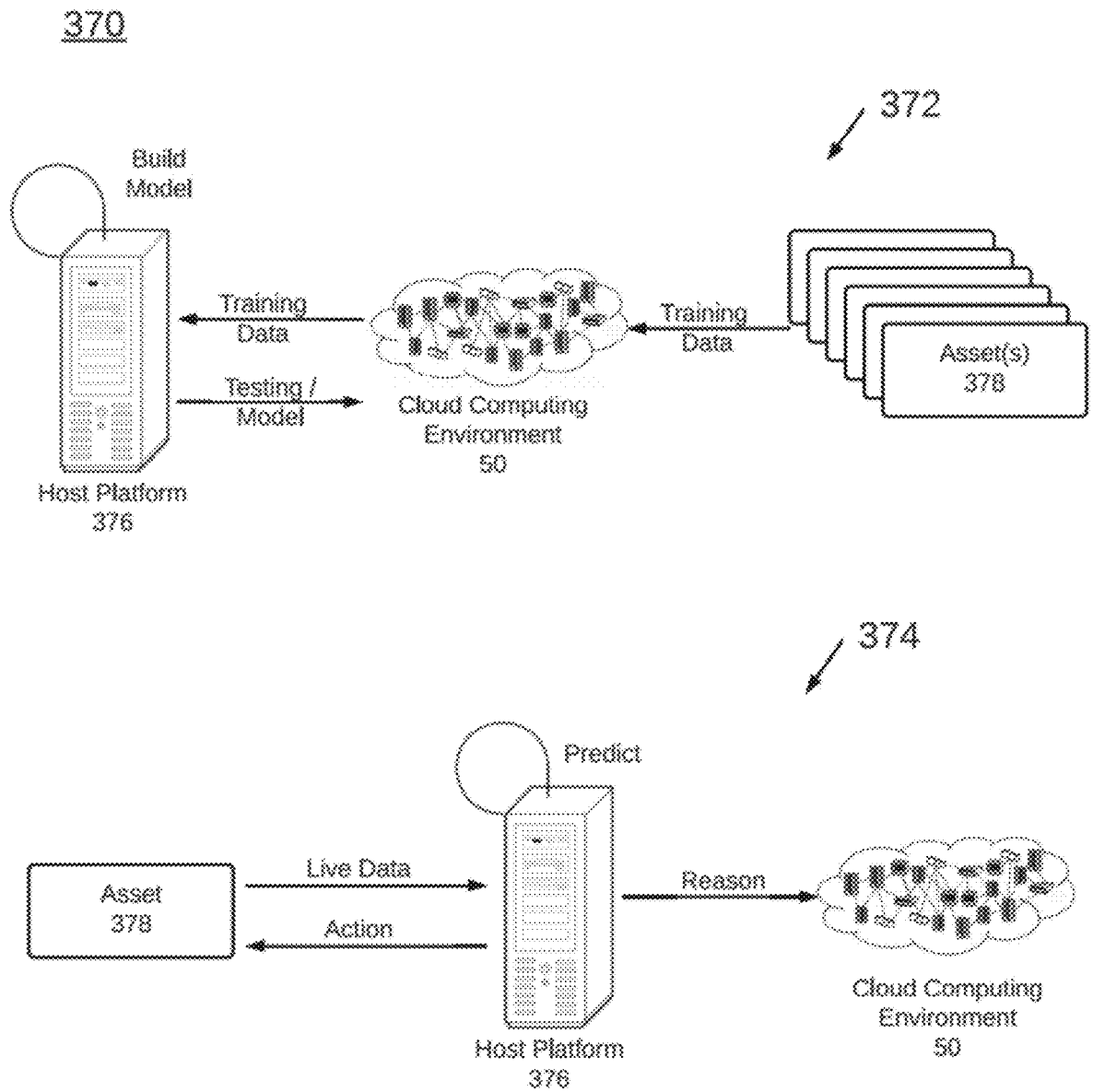
FIG. 3D is a diagram illustrating machine learning process via a cloud computing platform according to an example embodiment.
Figure 3E:
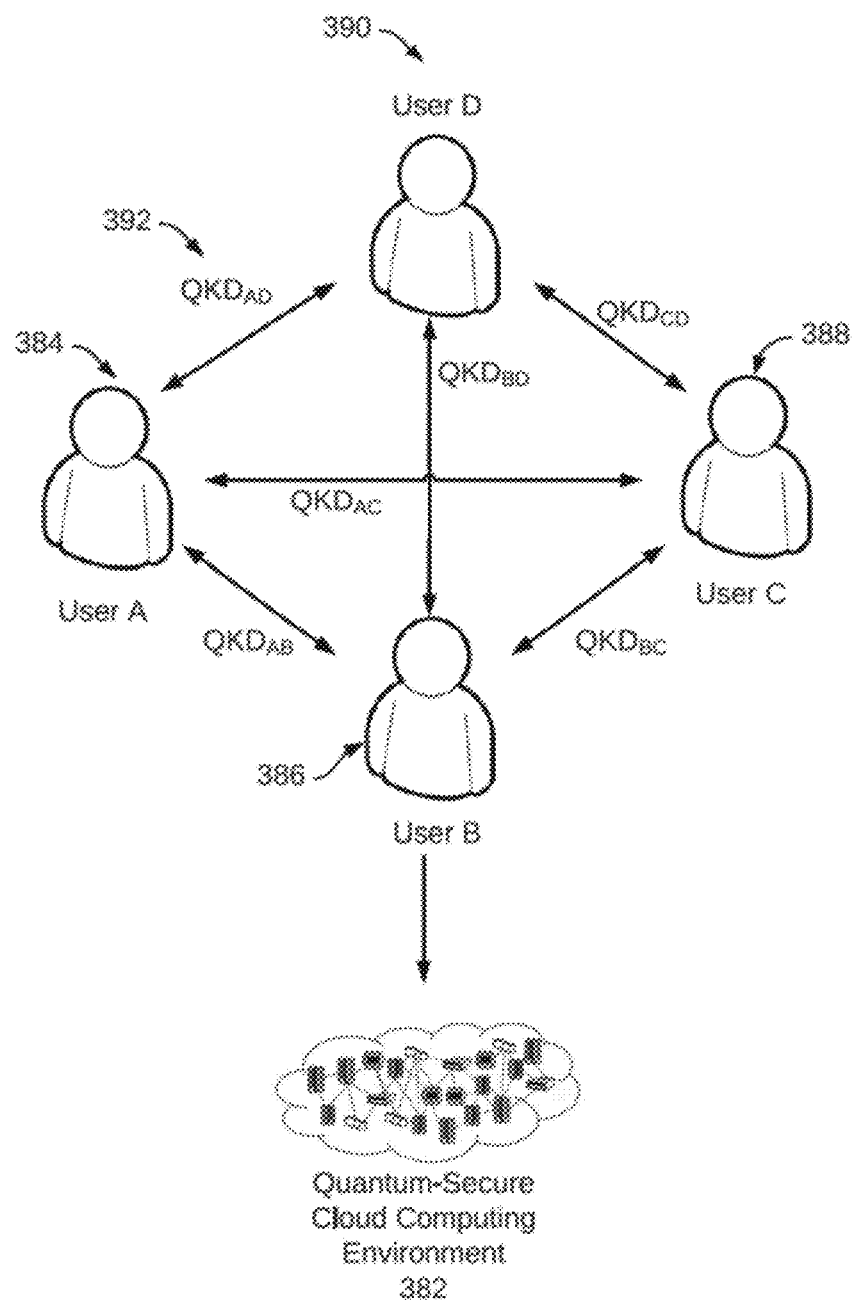
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 160, which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376, builds and deploys a machine learning model for predictive monitoring of assets 378. Here, the host platform 376 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 160 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 160. This can significantly reduce the collection time needed by the host platform 376 when performing predictive model training. For example, data can be directly and reliably transferred straight from its place of origin to the cloud computing environment 160. By using the cloud computing environment 160 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the associated data) may be stored on the cloud computing environment 160 by the host platform 376. Each refinement of the machine learning model (e.g., changes in variables, weights, etc.) may be stored in the cloud computing environment 160 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 160.

After the model has been trained, it may be deployed to a live environment where it can make predictions/decisions based on executing the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by executing the machine learning model at the host platform 376 may be stored on the cloud computing environment 160 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 160. In one embodiment, the features and/or the actions described and/or depicted herein can occur on or with respect to the cloud computing environment 160.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used, including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes, where it is entered into a pool of unconfirmed transactions. Here, two parties (i.e., a pair of users from among 384-390) authenticate the transaction by providing their shared secret key 392 (QKD). This quantum signature can be attached to every transaction, making it exceedingly difficult to be tampered with. Each node checks its entries with respect to a local copy of the cloud computing environment 382 to verify that each transaction has sufficient funds.

Figure 4A:
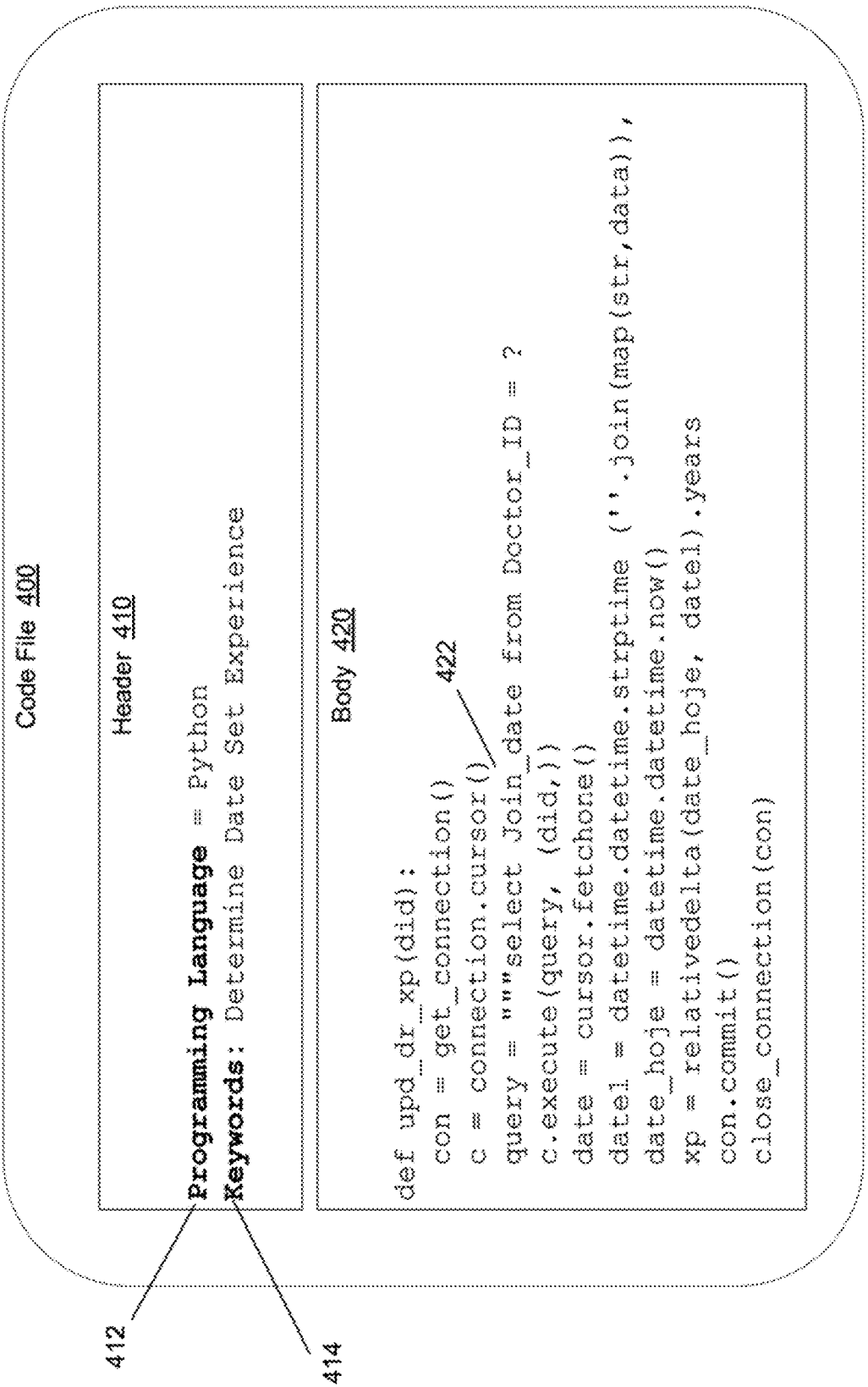
FIG. 4A is a diagram illustrating an example of a code file submitted by a developer according to an example embodiment.

FIG. 4A illustrates an example of a code file 400 submitted by a developer according to an example embodiment. Referring to FIG. 4A, the code file 400 includes a header section 410 and a body 420 with source code 422 stored therein. The source code may be in any programming language from among multiple different programming languages. The header section 410 may include a language identifier 412 that identifies the programming language of the source code stored in the body 420. The header section 410 may also include a description 414 of the source code stored in the body 420. In this example, the description 414 includes a list of keywords provided by the developer.

In the example of FIG. 4A, the source code stored in the body 420 of the code file 400 includes programming code in the PYTHON language. Here, the programming language identifier 412 identifies the type of programming language. Furthermore, the description 414 identifies two steps that are performed by a software application based on the source code including determining a date and setting an experience value.

FIG. 4B illustrates a process 440 of generating recommended code changes based on the submitted code file 400 and best practices according to an example embodiment. Referring to FIG. 4B, a code advisory system 430 according to various embodiments receives the code file 400 shown in FIG. 4A. In response, the code advisory system 430 may read the header section 410 of the code file 400 and identify the programming language of the source code and the keywords provided by the developer from the programming language identifier 412 and the description 414, respectively. As another example, if the code is a modified version of a previously submitted code file, the code advisory system 430 may use version control based on version control data stored within a data store 434.

The code advisory system 430 may perform a search with the source code from the body 420 of the code file 400. For example, the code advisory system may search a best practices repository 432 which is internally held by the code advisory system 430 and which contains best practice coding guidelines including class names, variables, programming statements, method clauses, and the like. Here, the code advisory system 430 may store the source code with a page and execute a search engine to search for code stored in a best practices repository 432 that is similar or otherwise related to the source code and that adheres to best practices or any other predefined coding standards. Here, the code advisory system 430 may compare the source code or a partial section of the source code to code samples in the best practices data store 432 to identify similar code as the source code.

Next, the code advisory system 430 may recommend changes to the source code from the body 420 of the code file 400 based on differences in the similar code found in the best practices data store 432 with respect to the source code. For example, the code advisory system 430 may recommend changes to variable names, class names, statements within the source code, methods within the source code, objects of code, and the like. The recommended code changes may be displayed by the code advisory system 430 on a user interface 436. An example of the recommended code changes being displayed is shown in FIG. 4D.

Referring to FIG. 4D, a modified code file with modified source code 462 is shown. Referring to FIG. 4D, the modified source code 462 correspond to the source code stored in the body 420 of the code file 400 in FIG. 4A. However, in this example, the code advisory system 430 has made numerous suggestions shown in 'bold' in the modified source code 462 that are based on the comparison with code stored in the best practices data store 432 that adheres to predefined coding standards. For example, the modified source code 462 includes a recommendation for a new class name "updated_doctor_experience" which is suggested to replace of the original class name "upd_dr_xp". As another example, the modified source code 462 includes a recommendation for a new variable name "doctor_id" in place of the original variable name "did". Multiple other changes are also suggested. The developer can quickly accept the changes by selecting the "ACCEPT" button or the like. If selected, the changes may automatically be incorporated into the source code within the body 420 of the code file 400. The modified code file may then be returned to the developer.

As noted above, the code advisory system 430 may recognize a programming language of source code stored in a code file and search for patterns of different coding languages described in a local database for the received file. After determining the coding language, the code advisory system 430 may search for a descriptive comment in the header of the code file. The advisory code system 430 may validate and check descriptive the description within the header of the code file. For example, the advisory code system 430 may generate a score of cohesion for the header description for score calculation purposes. If the score of cohesion is below a project average or other predefined threshold, the advisory code system may ask the user to improve the description. If the description is not present in the header, the advisory code system 430 will continue without it or may ask the user for a description input via the user interface. Meanwhile, if the header is present and not valid, the advisory code system 430 may alert user and deny the code from being stored in the repository.

FIG. 4C illustrates a process 450 of comparing the submitted code to predefined coding standards according to an example embodiment. Referring to FIG. 4C, in 451, the advisory code system 430 may start the search and extract the source code from the code file and any descriptive content from the header of the code file. In 452, the advisory code system may search documents, reports, educations, best practices in open forums, public communities, among others, using the description provided in the header of each code file and the source code itself. In 453, the advisory code system may search documents, reports, educations, best practices in private forums and intranet, among others, using the description provided in the header of each code file. In 454, the advisory code system categorizes and indexes results based on the most significative words found in the results.

With a list of the most frequent and significative words, the advisory code system may use these to search a synonym database 455 and categorize the results. The comparison and insights may be based on categories generated with the words and synonyms found (using a local database with synonyms dictionary). The definition of the most significative words will be based on TF-IDF (Term Frequency, Inverse Document Frequency) method applied to the isolated results and to the group as a whole. The list of categories may tend to be very large and repetitive, due to the addition of the synonyms. The list may be combined and stored within a results database 456 where it can be accessed for code comparison during future comparisons.

FIG. 5 illustrates a method of generating recommended code changes according to an example embodiment. For example, the method may be performed by a software application, integrated development environment (IDE), process, or the like, which is hosted on a cloud platform or other host system such as a web server, a database, a distributed network of systems, and the like. Referring to FIG. 5, in 510, the method may include storing code that adheres to predefined coding standards of one or more programming languages within a data store. For example, sections of code, snippets of code, files of code, and the like, may be stored and may be designed to conform to best practices of the industry or any other standards desired.

In 520, the method may include reading source code from a code file. Here, the code file may be submitted by a developer to the host platform where it is scanned by the code advisory system on a line-by-line basis to identify fields, classes, variables, etc. In 530, the method may include comparing the source code to programming statements stored in the data store which adhere to the predefined coding standards to determine one or more recommended code changes to the source code. For example, the host may search for similar code samples stored in the data store which adhere to the predefined coding standards and find one or more samples that are similar to the submitted code and use these for comparison and suggestion. In 540, the method may include displaying the one or more recommended code changes with the source code via a user interface.

In some embodiments, the data store may be a database, storage device, memory, or the like, which is configured to store a plurality of code files in a plurality of different programming languages which adheres to a plurality of predefined coding standards, respectively. In some embodiments, the reading may further include identifying a programming language of the source code from a header of the code file, and comparing the source code to code within the data store which adheres to a predefined coding standard of the identified programming language.

In some embodiments, the comparing may include identifying one or more variables within the source code which do not adhere to the predefined coding standards and recommending one or more conforming variables identified from the data store. In some embodiments, the comparing may include identifying one or more class names within the source code which do not adhere to the predefined coding standards and recommending one or more conforming class names identified from the data store.

In some embodiments, the comparing may include identifying one or more programming statements which do not adhere to the predefined coding standards within the source code and recommending one or more conforming programming statements identified from the data store. In some embodiments, the comparing may include executing a search of the data store based on the source code to identify a similar pattern of code that adheres to the predefined coding standards and comparing the source code to the similar pattern of code to determine the one or more recommended code changes.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
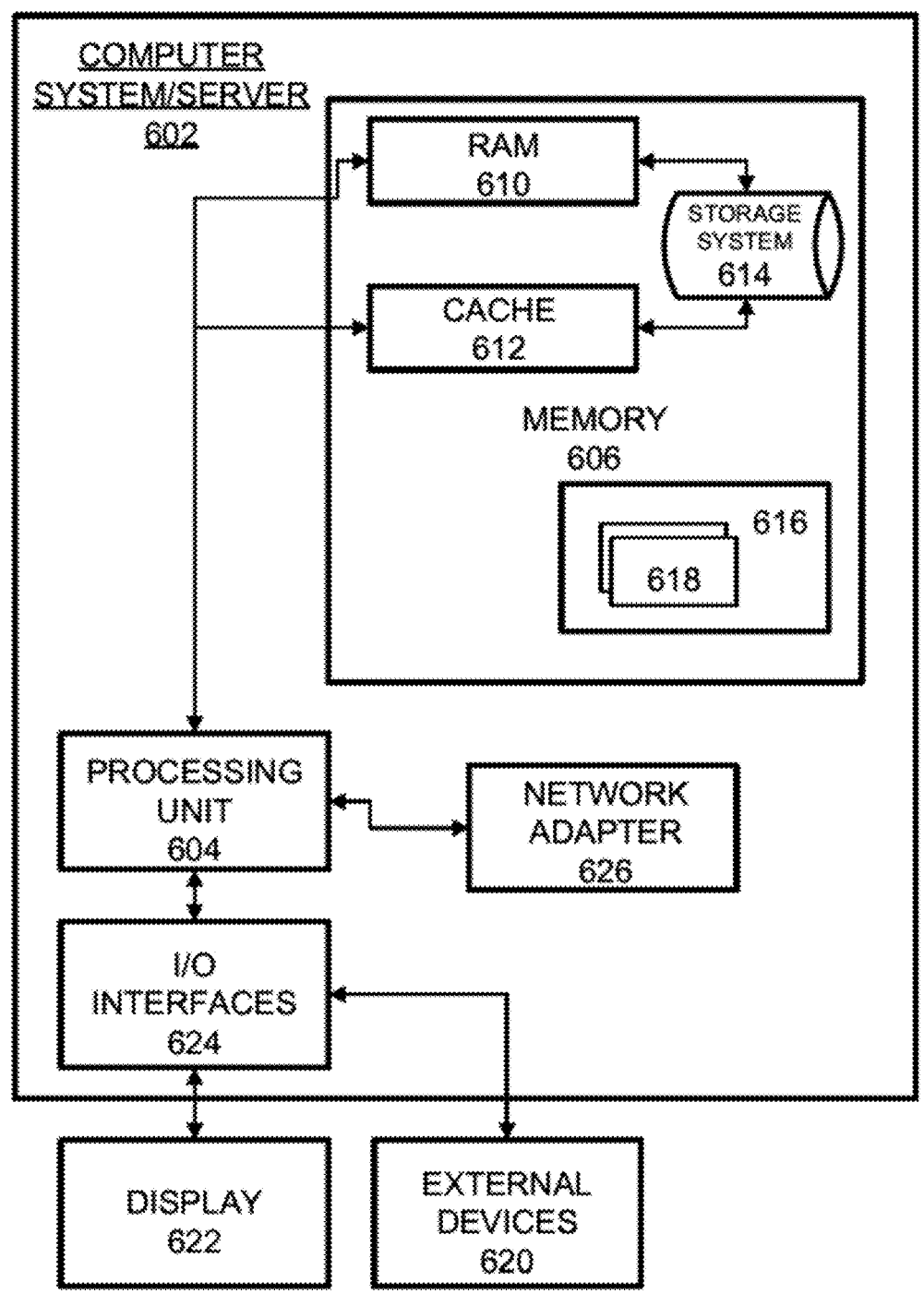
FIG. 6 is a diagram illustrating an example system that supports one or more of the example embodiments described herein.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components, including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof may include an implementation of a networking environment. Program modules 618 generally carry out the functions and/or methodologies of various application embodiments as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples include, but are not limited to: microcode, device drivers, redundant processing units, external disk drive arrays, RAID systems, tape drives, data archival storage systems, etc.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
    a data store configured to store code that adheres to predefined coding standards of one or more programming languages; and
    a processor configured to:
        read source code from a code file, wherein the code file comprises a header, the header comprising an identification of a programming language of the source code and a description of the source code;
        compare the source code to programming statements stored in the data store which adhere to the predefined coding standards to determine one or more recommended code changes to the source code;
        display the one or more recommended code changes with the source code via a user interface;
        generate a readability score for the source code; and
        in response to the readability score failing to meet a threshold, provide suggestions that improve a human readability of the source code.

2. The apparatus of claim 1, wherein the data store is configured to store a plurality of code files in a plurality of different programming languages which adheres to a plurality of predefined coding standards, respectively.

3. The apparatus of claim 2, wherein the processor is configured to compare the source code to code within the data store which adheres to a predefined coding standard of the identified programming language and configured to offer best practices based on the description in the header.

4. The apparatus of claim 1, wherein the processor is configured to identify one or more variables within the source code which do not adhere to the predefined coding standards and recommend one or more conforming variables identified from the data store.

5. The apparatus of claim 1, wherein the processor is configured to identify one or more class names within the source code which do not adhere to the predefined coding standards and recommend one or more conforming class names identified from the data store.

6. The apparatus of claim 1, wherein the processor is further configured to execute a search of the data store based on the source code to identify a similar pattern of code that adheres to the predefined coding standards and compare the source code to the similar pattern of code to determine the one or more recommended code changes.

7. A method comprising:
    storing code that adheres to predefined coding standards of one or more programming languages within a data store;
    reading source code from a code file, wherein the code file comprises a header, the header comprising an identification of a programming language of the source code and a description of the source code;
    comparing the source code to programming statements stored in the data store which adhere to the predefined coding standards to determine one or more recommended code changes to the source code, wherein the comparing comprises identifying one or more programming statements which do not adhere to the predefined coding standards within the source code and recommending the one or more conforming programming statements identified from the data store; and
    displaying the one or more recommended code changes with the source code via a user interface.

8. The method of claim 7, wherein the data store is configured to store a plurality of code files in a plurality of different programming languages which adheres to a plurality of predefined coding standards, respectively.

9. The method of claim 8, wherein the reading further comprises comparing the source code to code within the data store which adheres to a predefined coding standard of the identified programming language.

10. The method of claim 7, wherein the comparing comprises identifying one or more variables within the source code which do not adhere to the predefined coding standards and recommending one or more conforming variables identified from the data store.

11. The method of claim 7, wherein the comparing comprises identifying one or more class names within the source code which do not adhere to the predefined coding standards and recommending one or more conforming class names identified from the data store.

12. The method of claim 7, wherein the comparing comprises executing a search of the data store based on the source code to identify a similar pattern of code that adheres to the predefined coding standards and comparing the source code to the similar pattern of code to determine the one or more recommended code changes.

13. A computer-readable storage medium comprising instructions, that when read by a processor, cause the processor to perform a method comprising:
    storing code that adheres to predefined coding standards of one or more programming languages within a data store;
    reading source code from a code file, wherein the code file comprises a header, the header comprising an identification of a programming language of the source code and a description of the source code;
    comparing the source code to predefined programming statements within the code stored the data store to determine one or more recommended code changes to the source code;
    displaying the one or more recommended code changes with the source code via a user interface;
    generating a readability score for the source code; and
    in response to the readability score failing to meet a threshold, providing suggestions that improve a human readability of the source code.

14. The computer-readable storage medium of claim 13, wherein the data store is configured to store a plurality of code files in a plurality of different programming languages which adheres to a plurality of predefined coding standards, respectively.

15. The computer-readable storage medium of claim 14, wherein the reading further comprises comparing the source code to code within the data store which adheres to a predefined coding standard of the identified programming language.

16. The computer-readable storage medium of claim 13, wherein the comparing comprises identifying one or more variables within the source code which do not adhere to the predefined coding standards and recommending one or more conforming variables identified from the data store.

17. The computer-readable storage medium of claim 13, wherein the comparing comprises identifying one or more class names within the source code which do not adhere to the predefined coding standards and recommending one or more conforming variables identified from the data store.

18. The computer-readable storage medium of claim 13, wherein the comparing comprises executing a search of the data store based on the source code to identify a similar pattern of code that adheres to the predefined coding standards and comparing the source code to the similar pattern of code to determine the one or more recommended code changes.

* * * * *